United States Patent
Meadowcroft

(10) Patent No.: US 7,359,595 B2
(45) Date of Patent: Apr. 15, 2008

(54) ADAPTIVE TRANSMITTER ARRANGEMENT FOR OPTICAL FIBER COMMUNICATIONS AND RELATED METHOD

(75) Inventor: Simon Meadowcroft, Stowmarket (GB)

(73) Assignee: Avago Technologies Fiber IP Pte Ltd, Singapore (SG)

( * ) Notice: Subject to any disclaimer, the term of this patent is extended or adjusted under 35 U.S.C. 154(b) by 65 days.

(21) Appl. No.: 11/218,106

(22) Filed: Sep. 1, 2005

(65) Prior Publication Data

US 2006/0133727 A1    Jun. 22, 2006

(30) Foreign Application Priority Data

Dec. 22, 2004  (GB) ................. 0428033.5

(51) Int. Cl.
G02B 6/26 (2006.01)
G02B 6/42 (2006.01)
G02B 6/32 (2006.01)

(52) U.S. Cl. .................. 385/33; 385/15; 385/27; 385/31

(58) Field of Classification Search ............ 385/33
See application file for complete search history.

(56) References Cited

U.S. PATENT DOCUMENTS 4,054,364 A    10/1977  Webster ................. 385/33
4,981,338 A    1/1991   Bobb et al. ............. 385/12
5,077,622 A    12/1991  Lynch et al. ............ 359/813
6,147,799 A *  11/2000  MacDonald ............. 359/380
6,609,834 B2 * 8/2003   Cunningham et al. ..... 385/60
6,801,687 B2 * 10/2004  Pierce .................. 385/28
2002/0071627 A1 * 6/2002 Smith et al. ........... 385/15
2002/0102061 A1 * 8/2002 Lang .................... 385/50
2004/0114935 A1 * 6/2004 Fushimi et al. ......... 398/141
2004/0263968 A1 * 12/2004 Kobayashi et al. ...... 359/462

FOREIGN PATENT DOCUMENTS

EP    0 682 280 A1    11/1995
GB    2 316 187       2/1998

* cited by examiner

Primary Examiner—Frank G. Font
Assistant Examiner—Jerry Martin Blevins

(57) ABSTRACT

An arrangement for optical fibre communications, for used, e.g., in millimetre (MM) fibre transmission systems includes:
  a source (1) of optical radiation defining an offset launch path of optical radiation (R) into an optical fibre (F), and
  at least one active element (3,4; 6; 7) actuatable to selectively vary said offset launch path in order to achieve an adjustable offset launch of said optical radiations (R) into said optical fibre (F).

20 Claims, 2 Drawing Sheets

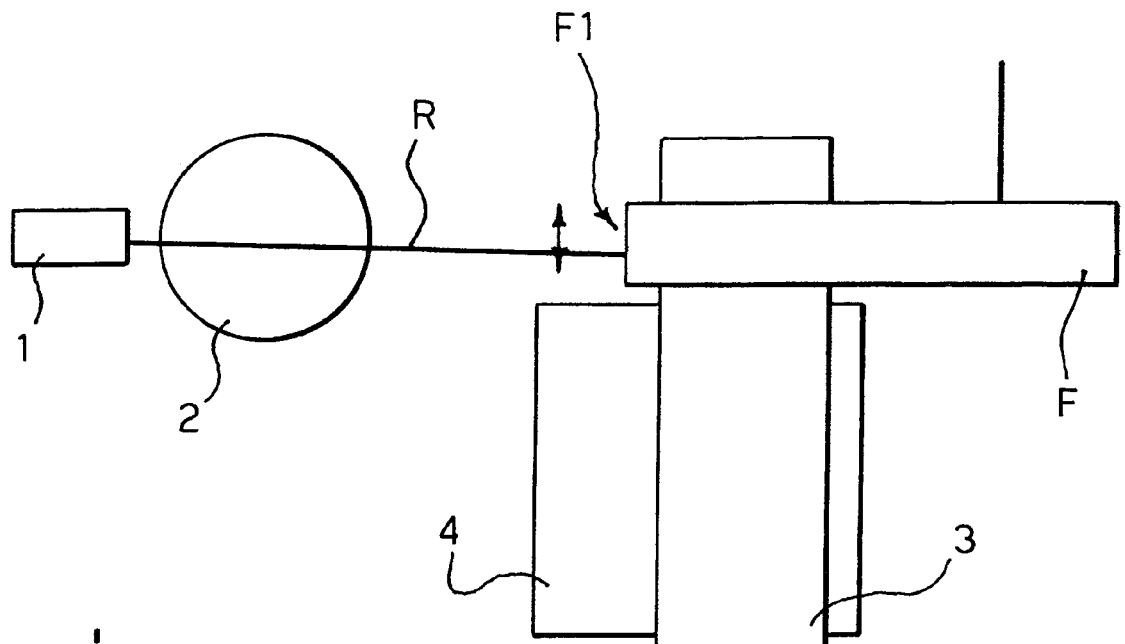
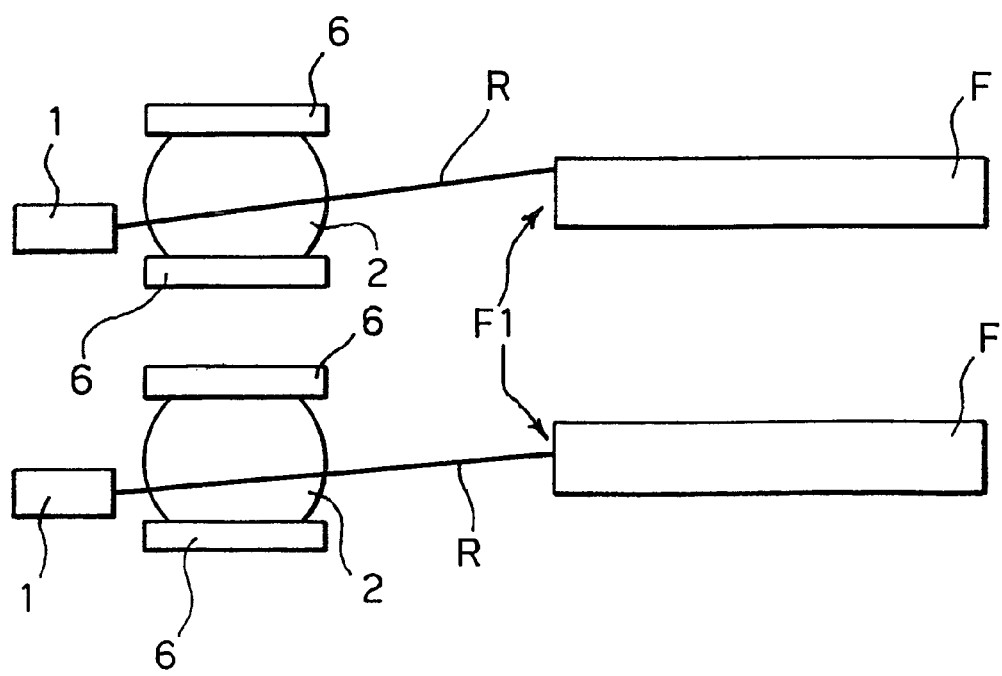

ADAPTIVE TRANSMITTER ARRANGEMENT FOR OPTICAL FIBER COMMUNICATIONS AND RELATED METHOD

FIELD OF THE INVENTION

The invention relates to optical fibre communications. The invention was developed by paying attention to the possible use in the area of millimeter (MM) optical fibre communications.

Reference to this possible field of application is however not to be construed in a limiting sense of the scope of the invention.

DESCRIPTION OF THE RELATED ART

Work is ongoing to increase the distance data can be sent via MM fibre at high speeds by employing a technique called EDC (i.e. Electronic Dispersion Compensation), which essentially involves the use of an equalization circuit at the receiver.

However, the received signal is badly distorted due to the modes and bandwidths of these modes in the fibre.

A present solution to this is to use an offset launch to select the near outer modes that are the most stable and uniform in bandwidth.

For instance, U.S. Pat. No. 6,064,786 discloses a method and apparatus for increasing the operational bandwidth of a multimode optical fibre communications system. The prior art arrangement in question involves launching optical radiation into the core of the multimode fibre away from the center of the core so as to strongly excite mid order modes of the multimode fibre, but to only weakly excite low order and high order modes of the multimode fibre. The mid order modes excited are predominantly within a small number of mode groups and thus have similar propagation constants. This leads to a reduction in modal dispersion and thus to a significant increase in bandwidth compared to an overfilled launch. This offset launch is indicated to be tolerant both to the launch conditions and to any imperfections in the fibre refractive index profile. Modal noise performance is also reportedly enhanced. Embodiments of this prior art arrangement employ a single mode fibre, a multimode fibre or a lens to illuminate an end face of a multimode fibre with a small spot offset from the optical axis of the fibre.

Unfortunately not all fibres have the same optimum offset position. This results in some fibres that employ a fixed offset launch to become very sensitive to e.g. fibre movement and other factors. This in turn causes bandwidth variations that are very large and hence not able to be recovered.

SUMMARY OF THE INVENTION

It is an object of the present invention to provide a solution that may dispense with the drawbacks inherent in the prior art arrangements considered in the foregoing.

According to the present invention, that object is achieved by means of an arrangement and method for optical fibre communications, a related method of manufacture as well as a related coupling process. The claims are an integral part of the disclosure of the present invention.

In brief, a presently preferred embodiment of the invention provides an arrangement for optical fibre communications including:

a source of optical radiation, such as a laser source, defining an offset launch path of said optical radiation into an optical fibre, and at least one active element actuatable to selectively vary said path in order to achieve an adjustable offset launch of said optical radiation into said optical fibre.

Such an arrangement permits to establish the optimum lateral offset for each particular fibre considered.

BRIEF DESCRIPTION OF THE DRAWINGS

The invention will now be described, by way of example only, with reference to the annexed figures of drawing, wherein:

FIG. 1 is representative of the general layout of an exemplary embodiment of the invention;

FIG. 2 is representative of a first variant of the arrangement as described herein.

DETAILED DESCRIPTION OF THE PREFERRED EMBODIMENT

Figure 3:
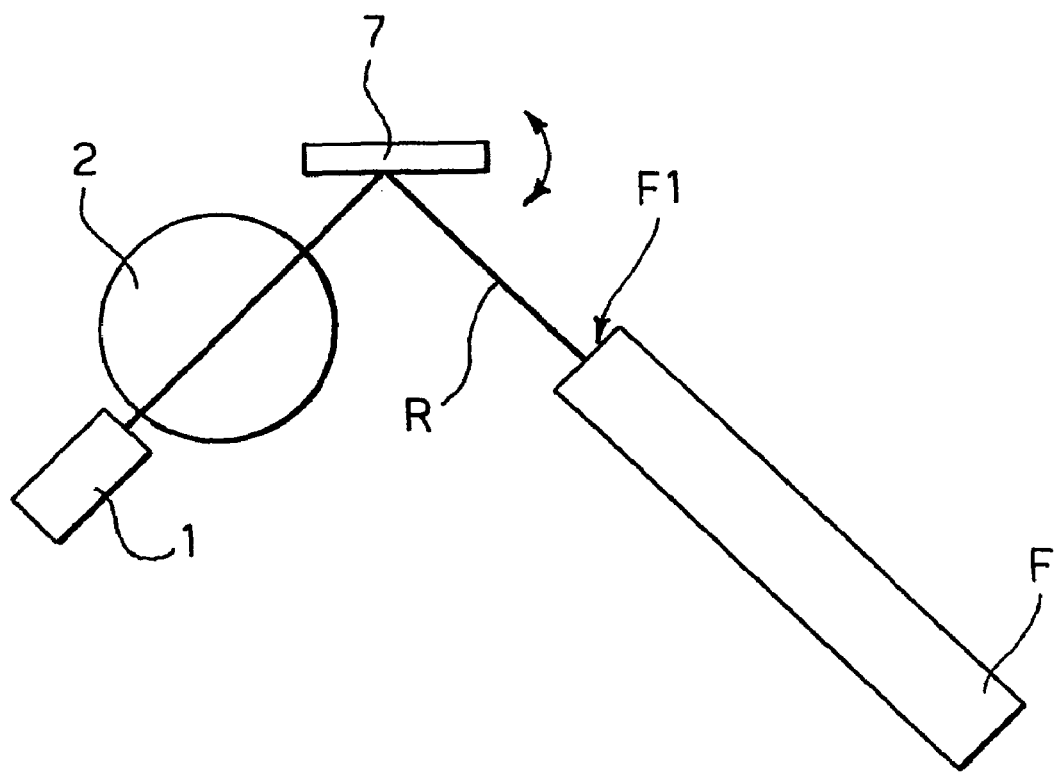
FIG. 3 is representative of a second variant of the arrangement described herein.

The arrangement shown in FIG. 1 includes an optical radiation source such as a laser 1 of any type used in optical fibre communications e.g. FP, DFB, EML, VCSEL, these acronyms being well known to those of skill in the relative art.

The laser 1 has its output coupled to a multimode fibre F in a typical offset launch arrangement as already discussed in the introductory portion of the description. The coupling could be butt or, according to the presently preferred embodiment shown, via a lens, such a spherical (i.e. "ball-type") lens 2.

A basic requirement to be complied with by the arrangements shown is for the radiation beam R that propagates from the laser 1 to be capable of moving in a controlled manner relative to the end face F1 of a fibre F into which the radiation R is launched. In that way, the launch path of the radiation R produced by the source 1 into the end face F1 of the fibre F may be selectively varied to achieve an adjustable offset launch of the optical radiation R into the optical fibre F.

Movement of radiation beam R can be either done optically (e.g. by means of a refractive index change) or physically (e.g. by moving any of the components such as the fibre F, the laser 1 and/or the lens 2 with respect to each other).

Physical movement can be produced e.g. thermally or via an electromechanical means. A Micro Electro-Mechanical System or MEMS is exemplary of such electromechanical means.

In all of FIGS. 1 to 3 references 1 and 2 indicate the laser source and the lens already described in the foregoing.

In the exemplary embodiment shown in FIG. 1, the end of the fibre F near the end face F1 is arranged over a high (thermal) expansion member in the form of e.g. a rod 3, which in turn is mounted on a heater element 4.

Activating/de-activating the heater 4 leads to a change in the temperature of the rod 3 and hence to a variation in the position of the fibre F mounted thereon relative to the optical beam R. This occurs as schematically shown by the double arrow in FIG. 1 and provides a means of having an adjustable offset launch at the transmitter, so that the optimum lateral offset is established for a particular fibre.

FIG. 2 shows a twin arrangement of two laser sources 1 producing radiation beams R to be injected into two respective fibres F. Each one of the lasers 1 has an associated lens 2, such as a ball lens, wherein a change in the refractive index is induced. Preferably this occurs via a pair of liquid crystals (LCs) 6 having the lens 3 sandwiched therebetween.

By applying a variable voltage across the LC (i.e. by changing the voltage across the lens 2), its profile is changed, which in turn results in an offset beam steer.

This again provides a means of having an adjustable offset launch at each of the laser sources 1, so that the optimum lateral offset is established for each particular fibre F.

An alternative (not directly shown) may be using a lens design for the LC. Then its focal point may be altered or in this case the beam would be deflected to a different position. In order for this to be controlled, it is important for each active element (e.g. each liquid crystal 6) to have feedback from the other end of the fibre F.

To that effect, a pilot tone or equivalent is generated (in a manner known per se) at the other end of the fibre F. This is transmitted back towards the laser source 1, i.e. to the transceiver that includes the source 1. The tone is an instruction to an active element/actuator to move (or not to move) the beam relative to the end face F1 of the fibre F in a particular direction.

FIG. 3 shows that, as an alternative to the liquid crystals considered in the foregoing, the actuator in question may be represented by a Micro Electro-Mechanical System or MEMS configured for rotating a reflective mirror 7. The mirror 7 is interposed in the path between the lens 2 and the input face F1 of the fibre 1. Rotating the mirror 7 as schematically shown by the double arrow of FIG. 3 allows the beam to move across the fibre face F1.

This again provides a means of having an adjustable offset launch at the laser source 1, so that the optimum lateral offset is established for each particular fibre.

Without prejudice to the underlying principles of the invention, the embodiments and details may vary, also significantly, with respect to what has been described by way of example only, without departing from the scope of the invention as defined by the claims that follow. Specifically, those of skill in the art will appreciate that terms such as "optical", "light", and the like are evidently used herein with the meaning currently allotted to those terms in fibre and integrated optics, being thus intended to apply, in addition to visible light, also e.g. to radiation in the infrared and ultraviolet ranges.

The invention claimed is:

1. An arrangement for optical fibre communications comprising:
   a source of optical radiation defining an offset launch path of said optical radiation into an optical fibre, wherein said launch path at the point of entry into said optical fibre is offset from a center of said of said optical fibre, and
   at least one active element actuatable to selectively vary said path in order to adjust said offset from said center of said optical fibre.

2. The arrangement of claim 1, wherein said source of optical radiation includes a laser source.

3. The arrangement of claim 2, wherein said laser source is at least one selected from the group consisting of: FP, DFB, EML, and VCSEL laser sources.

4. The arrangement of claim 1, wherein said offset launch path includes a butt coupling.

5. The arrangement of claim 1, wherein said offset launch path includes a lens.

6. The arrangement of claim 1, wherein at least one active element is actuatable to selectively vary said path optically.

7. The arrangement of claim 6, wherein said at least one active element is actuatable to selectively vary said path by means of a refractive index change.

8. The arrangement of claim 7, further comprising a lens interposed in said offset launch path of said optical radiation, and at least one liquid crystal associated with said lens, said at least one liquid crystal adapted to selectively change the profile of said lens.

9. The arrangement of claim 8, further comprising a pair of said liquid crystals having said lens sandwiched therebetween.

10. The arrangement of claim 6, further comprising a liquid crystal having a lens design interposed in said offset launch path of said optical radiation, the focal point of said lens design being adapted to be altered to selectively vary said path.

11. The arrangement of claim 1, wherein at least one active element is actuatable to selectively vary said path by physically moving at least one component.

12. The arrangement of claim 11, wherein at least one active element includes a thermally actuatable element.

13. The arrangement of claim 12, wherein at least one active element comprises:
   a thermal expansion member adapted to carry said end face of said optical fibre, and
   a heater element associated with said thermal expansion member, whereby activating/de-activating said heater element leads to a change in the temperature of said thermal expansion member and hence to a variation in the position of said end face of said optical fibre.

14. The arrangement of claim 11, wherein at least one active element includes an electromechanical means.

15. The arrangement of claim 14, wherein at least one active element includes a Micro Electro-Mechanical System.

16. The arrangement of claim 1, further comprising a reflective mirror interposed in said offset launch path of said optical radiation, said mirror rotatable to selectively vary said launch path.

17. The arrangement of claim 1, wherein said at least one active element is configured for receiving instruction back from said optical fibre to selectively vary said launch path in order to achieve an adjustable offset launch of said optical radiation into said optical fibre.

18. A method of optical fibre communication comprising:
   providing a source of optical radiation,
   defining an offset launch path of said optical radiation from said source into an optical fibre, wherein said launch path at the point of entry into said optical fibre is offset from a center of said of said optical fibre, and
   selectively varying said offset launch path in order to adjust said offset from said center of said optical fibre.

19. The method of claim 18, wherein said optical fibre comprises a multimode fibre having mid order modes, low order modes and high order modes, and wherein said offset launch strongly excites said mid-order modes, but weakly excites said low order modes and said high order modes, thereby increasing bandwidth.

20. The arrangement of claim 1, wherein said optical fibre comprises a multimode fibre having mid order modes, low order modes and high order modes, and wherein said offset launch strongly excites said mid-order modes, but weakly excites said low order modes and said high order modes, thereby increasing bandwidth.

* * * * *

UNITED STATES PATENT AND TRADEMARK OFFICE
CERTIFICATE OF CORRECTION

PATENT NO. : 7,359,595 B2  Page 1 of 1
APPLICATION NO. : 11/218106
DATED : April 15, 2008
INVENTOR(S) : Simon Meadowcroft It is certified that error appears in the above-identified patent and that said Letters Patent is hereby corrected as shown below:

Title page, Item [54] Column 1, (Title), Line 2, delete "FIBER" and insert -- FIBRE --;

Title page, Item [57] Column 2, (Abstract), Line 4, after "source" delete "(1)";

Title page, Item [57] Column 2, (Abstract), Line 5, after "radiation" delete "(R)";

Title page, Item [57] Column 2, (Abstract), Line 5, delete "fibre (F)," and insert -- fibre, --;

Title page, Item [57] Column 2, (Abstract), Line 7, after "element" delete "(3,4; 6; 7)";

Title page, Item [57] Column 2, (Abstract), Line 10, delete "radiations (R)" and insert -- radiation --;

Title page, Item [57] Column 2, (Abstract), Line 10, delete "fibre (F)." and insert -- fibre. --;

Column 1, Line 2, delete "FIBER" and insert -- FIBRE --;

Column 3, Line 49 (Approx.), Claim 1, after "center" delete "of said";

Column 4, Line 50, Claim 18, after "center" delete "of said".

Signed and Sealed this

Eighth Day of June, 2010

David J. Kappos
*Director of the United States Patent and Trademark Office*